A. H. NEUREUTHER.
WEIGHING SCALE.
APPLICATION FILED JULY 1, 1909.
941,725.  Patented Nov. 30, 1909.
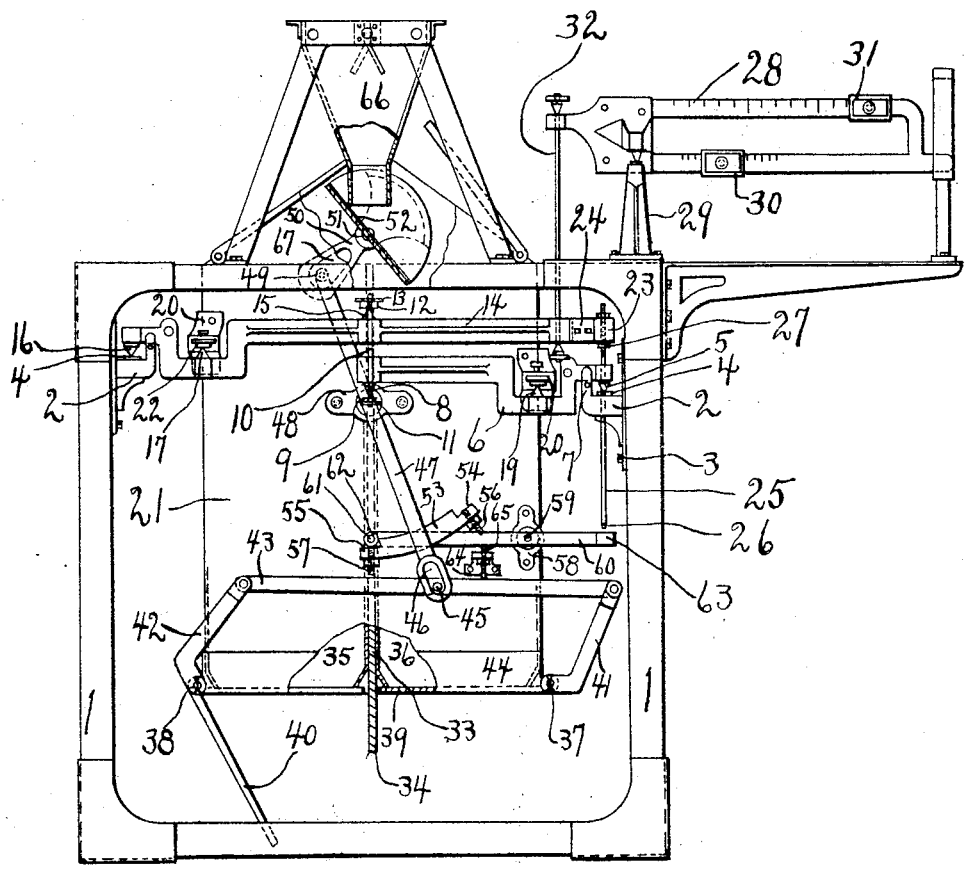
WITNESSES:
William A. Radtke.
O. W. Dauber.
INVENTOR
Andrew H. Neureuther.

UNITED STATES PATENT OFFICE.

ANDREW H. NEUREUTHER, OF PERU, ILLINOIS.

WEIGHING-SCALE.

941,725.

Specification of Letters Patent.

Patented Nov. 30, 1909.

Application filed July 1, 1909. Serial No. 505,487.

*To all whom it may concern:*

Be it known that I, ANDREW H. NEUREUTHER, of the city of Peru, county of Lasalle, and State of Illinois, have invented a new and useful Improvement in Weighing-Scales, of which the following is a specification.

My invention relates to improvements in scales of the twin hopper or double compartment type for automatically weighing cement, grain and the like, and has for its object the production of such a scale that will weigh very accurately, and that will be simple, easily adjusted and constructed.

In the drawings, Figure 1 is a side view of my automatic scale, showing some of the parts ordinarily concealed, in section.

Similar numerals represent similar parts throughout the drawings.

In the drawings 1 represents the frame of the scale, to the vertical members of which are fastened the projecting members 2, by means of bolts 3. Fastened to each of these members 2 is a hardened plate 4 which forms a bearing for a knife edge 5 fastened on the end of a weighing lever 6. Weighing lever 6 passes between the lugs 7 of member 2 and is formed as shown. Fastened on the other end of said lever 6 is a knife edge 8 which bears on a hardened plate 9 on the supporting link 10, which link has an upper supporting plate 12 and nuts 13 and 11 for adjusting the length of said link. Link 10 connects lever 6 with a lever 14 which has a knife edge 15 which bears on said plate 12, and a knife-edge 16 which bears on a similar hardened plate 4 on one of the projecting members 2 fastened to frame 1 as above described. Lever 14 has another knife-edge 17 which supports the hopper 21 by means of a lug 20 fastened to the hopper with the hardened plate 22 mounted on said lug. Plates 22 may be adjustably mounted on the lugs 20. Lever 6 has a similar intermediate knife-edge 19 which supports the hopper 21 by means of a lug 20 fastened thereto. There is a similar set of levers 6 and 14 on the other side of the hopper 21, which assist in supporting the hopper, said levers 14 being the levers that finally transmit the weight to the scale beam as will be described below. The right hand end of these levers 14 are connected by means of a cross-piece 24 which has a lug 23 from which projects a tripping rod 25 having a projection or foot 26, said rod being adjustably fastened in an aperture in lug 23 by means of the nuts 27 shown. Weighing lever 14 is connected to the weighing beam 28 which is pivotally mounted on a pedestal 29 fastened to the frame 1 as shown, by means of the link 32 and the usual knife-edges or pivoted bearings shown. Weighing beam 28 has a weight 30 for balancing the scale when the hopper 21 is empty and a weight 31 for determining the weight of the material in the hopper. It will thus be seen that the hopper 21 is supported by the weighing levers 6 and 14, and that when material is put in the hopper it tends to move downward, moving the lug 23 of lever 14 downward, and hence moves the foot 26 of the rod 25 downward, and further causes the right end of the scale beam, when the required amount of material is in the hopper, to move upward, or balance and permit the motion above described.

The hopper 21 is divided into two compartments 35 and 36 by means of a central partition 33 which has a projecting lip 34 below the hopper. The lower ends of each of the compartments flare inward as shown. Hinged to a frame 44 fastened to the bottom of each of these compartments at 37 and 38 respectively, are doors 39 and 40. Door 39 has a pair of projecting levers 41, each of which is pivotally connected with one end of a link 43, and door 40 has similarly projecting levers 42 each of which is pivotally connected to the other ends of said links 43. These doors 39 and 40 are so connected by means of this link 43, so that when one door is closed, the other door will be open. Link 43 has fastened to it a pin or roll 45 which engages a slot 46 in a lever 47 which is pivotally connected to a bracket 48 fastened on the side of the hopper 21. The upper end of lever 47 has a roll 49 which engages a cam-shaped slot 67 of a lever 50 which is pivoted to the frame 1 at 51. Attached to this lever 50 is a deflecting plate 52 whose function is to guide the material coming from the bins above the scale into the compartment of the hopper which is closed, it being so connected with the doors 39 and 40 by means of the intervening linkages just described, that when the hinged door 39 is closed, the plate will deflect the material into the right hand compartment as shown in the drawings. When the hinged door 40 is closed it will stand just opposite to the position shown in the drawings, and deflect the material into the left compartment.

Attached to the lower end of the lever 47 is a segment 53 having notches 54 and 55. Said notches have the adjusting screws 56 and 57 respectively, each with the locknut shown to securely retain said screws in position. Pivoted on a pin 59 fastened in a plate 58 mounted on the hopper 21 is a trip lever 60, one end of which has a pin 61 on which is journaled a roll 62 which alternately engages the notches 55 and 54 of said segment 53, engaging the notch 55 when compartment door 39 is closed as shown, and engaging notch 54 when compartment door 40 is closed. The other end of the trip lever 60 projects beyond the hopper 21, (there being a similar lever and mechanism on the other side of the hopper) and connects with the cross-piece 63 which lies in the path of the foot 26 of the trip rod 25 above mentioned, so that when a compartment is filled and brings the scale beam 28 up, the foot 26 strikes cross-piece 60 causing roll 62 to disengage from the notch 55, when the weight of the material on the bottom door will cause it to open shifting the entire lever connecting mechanism to the opposite position, so that the roll 62 engages notch 54. Mounted immediately below said lever 60 is a bracket 64 which carries an adjusting screw 65 having the locknut shown, by means of which screw the position of the roll 62 can be adjusted so as to make it trip very easily and hence make my scale weigh very accurately. The funnel 66 is attached to the bin in which the material is stored.

In practice my scale operates as follows:— Starting in the position shown in the drawings, the material from funnel 66 strikes the deflecting plate 52 and is fed into the compartment 36. During this time the door 40 of the compartment 35 is open and is discharging its contents. As soon as the required weight of material has entered said compartment 36 it depresses levers 6 and 14, thereby raising the scale beam 28 and lowering rod 25 and the foot 26 of same which foot 26 strikes the cross-piece 63 the trip lever 60 which disengages its roll 62 from the notch 55 of segment 53, when the weight of the material in compartment 36 forces its door 39 downward, which as is evident from the above description of the link mechanism, closes the door 40 of the compartment 35, and moves the segment 53 to the left so that roll 62 engages the notch 54 and lever 47 shifts the deflecting plate 52 so that it feeds into the compartment 35, which when it has the proper weight of material again similarly causes the said lever 60 to be tripped, returning the mechanism to the position shown in the drawings. It is thus entirely automatic in operation, delivering constant uniform weights of material to any receptacle placed below the apparatus. The adjusting screws 56—57 and 65 enable the mechanism to be accurately adjusted so that the resulting weights of material will be perfectly uniform.

It will be understood, of course, that while I have here shown and described one form of my invention, it is to be taken in a sense diagrammatic of all such devices as come within the scope of my claims.

I claim:—

1. In an automatic weighing scale comprising a supporting frame, weighing and graduated levers, a weighing hopper supported on the weighing levers, said hopper being divided into two compartments by means of a central partition, doors journaled on said compartments for controlling the discharging of same, mechanism for connecting said doors so that they open and close alternately, deflecting means immediately above said central partition, a lever journaled on the hopper connecting said door mechanism and said deflecting means, a segment on said lever having two notches, a trip lever pivotally connected to the weighing hopper, a roll journaled on said trip lever which roll alternately engages said notches, a rod projecting from the weighing lever which engages said trip lever disengaging its roll from the notch of said segment when a compartment has received the pre-determined weight of material.

2. In an automatic weighing scale, a supporting frame, weighing and graduated levers, a weighing hopper supported on the weighing levers, said hopper being divided into two compartments by means of a central partition, a door journaled on each of said compartments for controlling the discharging of same, mechanism connecting said doors so that they open and close alternately, deflecting means immediately above said central partition, a lever journaled on the hopper connecting said door mechanism and said deflecting means, a segment on said lever having two notches, adjusting means in said notches, a trip lever pivotally connected to the weighing hopper, a roll journaled on said trip lever which roll alternately engages said notches, a rod adjustably connected to and projecting from the weighing lever which strikes said trip lever disengaging its roll from a notch on said segment, and means adjacent to said trip lever for regulating the position thereof, substantially as shown and described.

3. In an automatic weighing scale, a supporting frame, weighing and graduated levers mounted thereon, a two compartment weighing hopper supported on the weighing levers, a door hinged to the bottom of each compartment, mechanism connecting said doors so that they alternately open and close, deflecting means located immediately above said compartments, a lever pivotally mounted on said hopper and operatively connected with the door mechanism and the deflecting means, a segment rigidly mounted on said lever, notches formed in said segment, a trip lever pivotally mounted on the hopper a roll journaled on said trip lever said roll alternately engaging said notches, and a rod projecting from one of the weighing levers which actuates the trip lever when a pre-determined weight of material is in one compartment of the hopper, substantially as shown and described.

4. In an automatic weighing scale, a supporting frame, weighing and graduated levers mounted thereon, a two compartment weighing hopper supported on the weighing levers, a door hinged to the bottom of each compartment, mechanism connecting said doors so that they alternately open and close, deflecting means located immediately above said compartments, a lever pivotally mounted on said hopper and operatively connected with the door mechanism and the deflecting means, notches formed on said lever, adjusting means in said notches, a trip lever pivotally mounted on the hopper, a roll journaled on said trip lever, said roll alternately engaging said notches, and a rod adjustably connected with one of the weighing levers which actuates the trip lever when a pre-determined weight of material is in the hopper.

ANDREW H. NEUREUTHER.

Witnesses:
O. W. DAUBER,
WILLIAM A. RADTKE.